(12) United States Patent
Lee

(10) Patent No.: US 11,093,713 B2
(45) Date of Patent: Aug. 17, 2021

(54) METHOD FOR GENERATING SEARCH INDEX AND SERVER UTILIZING THE SAME

(71) Applicant: AVISION INC., Hsinchu (TW)

(72) Inventor: Hsin-Chen Lee, Hsinchu (TW)

(73) Assignee: AVISION INC., Hsinchu (TW)

(*) Notice: Subject to any disclaimer, the term of this patent is extended or adjusted under 35 U.S.C. 154(b) by 631 days.

(21) Appl. No.: 15/615,650

(22) Filed: Jun. 6, 2017

(65) Prior Publication Data
US 2018/0024988 A1 Jan. 25, 2018

(30) Foreign Application Priority Data

Jul. 21, 2016 (TW) .................................. 105123067

(51) Int. Cl.
| | | |
|---|---|---|
| *G06F 16/00* | (2019.01) | |
| *G06F 40/295* | (2020.01) | |
| *G06F 16/31* | (2019.01) | |
| *G06F 16/13* | (2019.01) | |
| *G06K 9/00* | (2006.01) | |

(52) U.S. Cl.
CPC ............ *G06F 40/295* (2020.01); *G06F 16/13* (2019.01); *G06F 16/313* (2019.01); *G06K 9/00469* (2013.01)

(58) Field of Classification Search
CPC .......... G06F 16/10; G06F 16/22; G06F 16/31; G06F 16/41; G06F 16/61; G06F 16/71; G06F 16/901
USPC .................................................. 707/711, 741
See application file for complete search history.

(56) References Cited

U.S. PATENT DOCUMENTS

| | | | |
|---|---|---|---|
| 6,278,992 B1* | 8/2001 | Curtis | ................ G06F 16/2237 707/711 |
| 2007/0136340 A1 | 6/2007 | Radulovich | |
| 2010/0121642 A1* | 5/2010 | Hori | ...................... G06F 16/685 704/254 |
| 2011/0252018 A1 | 10/2011 | Bhose et al. | |
| 2012/0323902 A1 | 12/2012 | Yao et al. | |

(Continued)

FOREIGN PATENT DOCUMENTS

| | | |
|---|---|---|
| CN | 1300028 A | 6/2001 |
| CN | 101916164 A | 12/2010 |

(Continued)

OTHER PUBLICATIONS

Taiwan Office Action dated Jun. 19, 2017 in application No. 105123067.

(Continued)

*Primary Examiner* — Alexandria Y Bromell
(74) *Attorney, Agent, or Firm* — Maschoff Brennan

(57) ABSTRACT

A method for generating a search index, applicable for a database system having a first database and a second database, includes the follow steps: receiving an access instruction corresponding to a first document, analyzing the first document to obtain a plurality of key character strings, writing the first document into the first database or the second database based on the access instruction and generating address information corresponding to the first document accordingly, and generating a search index corresponding to the first document based on the address information and the key character strings.

7 Claims, 4 Drawing Sheets

1000

(56) References Cited

U.S. PATENT DOCUMENTS

| | | | |
|---|---|---|---|
| 2014/0181119 A1* | 6/2014 | Chiueh | G06F 16/137 707/747 |
| 2015/0169745 A1 | 6/2015 | Morimoto et al. | |
| 2015/0170710 A1* | 6/2015 | Horita | G11B 27/105 386/241 |
| 2016/0255047 A1* | 9/2016 | Parthasarathy | H04L 61/3025 709/245 |
| 2017/0017837 A1* | 1/2017 | King | H04N 1/32101 707/707 |

FOREIGN PATENT DOCUMENTS

| | | |
|---|---|---|
| CN | 103488709 A | 1/2014 |
| CN | 103795696 A | 5/2014 |
| CN | 105320746 A | 2/2016 |
| TW | 201519150 A | 5/2015 |
| WO | 2007070774 A2 | 6/2007 |

OTHER PUBLICATIONS

CN Office Action in application No. 201611108711.6 dated Aug. 5, 2019.

* cited by examiner

METHOD FOR GENERATING SEARCH INDEX AND SERVER UTILIZING THE SAME

CROSS-REFERENCE TO RELATED APPLICATIONS

This non-provisional application claims priority under 35 U.S.C. § 119(a) on Patent Application No(s). 105123067 filed in Taiwan, R.O.C. on Jul. 21, 2016, the entire contents of which are hereby incorporated by reference.

TECHNICAL FIELD

The disclosure relates to a method for generating a search index and a server utilizing the same, and particularly to a distributed database and method for generating a search index thereof.

BACKGROUND

Cloud storage device or service is applied in the daily life more and more broadly. For example, Google Drive® and Dropbox® are both often-used cloud storage devices/services. Nowadays, one usually uploads digital documents such as text file, Microsoft document file, portable document format, etc. to his/her own cloud storage device.

However, as the occupied storage space getting larger and larger, people tend to used more than one cloud storage device or service. It leads to a problem that when a user has many cloud storage devices, the user not necessarily saves the documents to a corresponding cloud storage device according to the category of each document. Hence, the user needs to pay much effort to search in each cloud storage device when he or she wants to find a document with specific keyword from a plurality of cloud storage devices.

SUMMARY

A method for generating a search index according to one embodiment of the disclosure is applicable for a database system having a first database and a second database. The method includes the steps of: receiving an access instruction corresponding to a first document, analyzing the first document to obtain a plurality of first key character strings corresponding to the first document, writing the first document into the first database or the second database according to the access instruction and generating a first address information corresponding to the first document, and generating a first search index corresponding to the first document with the first address information and the plurality of first key character strings.

A server according to one embodiment of the disclosure is applicable for communicating with a first database and a second database. The server includes a processor and an access controller. The processor is configured for analyzing a first document to obtain a plurality of first key character strings corresponding to the first document when the processor receives an access instruction corresponding to the first document. The access controller communicates with the processor, the first database and the second database, and is configured for writing the first document to the first database or the second database according to the access instruction, and for generating first address information corresponding to the first document. The processor further generates a first search index corresponding to the first document with the first address information and the plurality of first key character strings.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
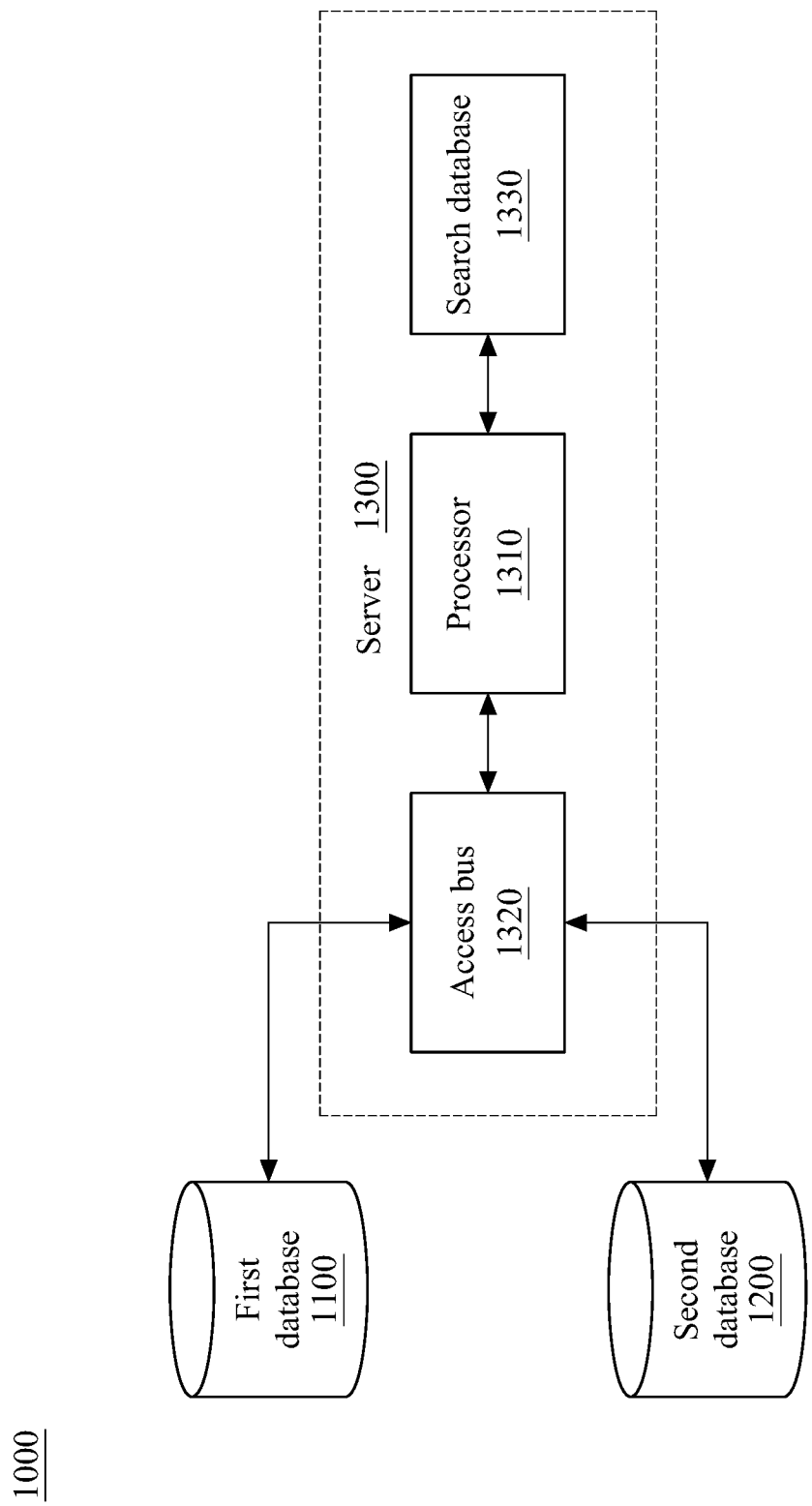
FIG. 1 is a block diagram of a database system according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a block diagram of a database system according to one embodiment of the disclosure. As shown in FIG. 1, the database system 1000 in the embodiment includes a first database 1100, a second database 1200, and a server 1300. The server 1300 communicates with both of the first database 1100 and the second database 1200. Practically, the term "communicate with" means that there may be data transmitted/received between the server 1300 and the first database 1100 and/or the second database 1200.

The server 1300 includes a processor 1310, an access controller 1320 and a search database 1330. The access controller 1320 is electrically connected to the processor 1310. Further, the access controller 1320 communicates with the first database 1100 and the second database 1200. The processor 1310 access the first database 1100 and/or the second database 1200 via the access controller 1320. The search database 1330 communicates with the processor 1310.

The aforementioned database may be a non-volatile storage device such as a physical hard disk, a disk array, a tape, a flash storage medium, etc. The aforementioned processor may be a central processing unit, a micro control unit, an advanced RISC machine (ARM), or other circuit having ability of signal processing, logic operation, and controlling electronic device.

In one embodiment, when the user wants to save a first document in the first database 1100, the first document is sent to the server 1300 first, and the access instruction indicates that the first document is to be saved in the first database 1100. Hence, before the processor 1310 writes the first document into the first database 1100 via the access controller 1320, the processor 1310 is capable of analyzing the first document to obtain the key character strings of the first document. In one embodiment, the key character strings includes the file name of the first document.

Practically, the processor 1310 determines whether the first document is a text file. When the first document is not a text file, the processor 1310 performs an image recognition process on the first document to generate a text file of the first document, and captures the contents of the text file to obtain one or more first key character strings corresponding to the first document.

In the process determining whether the first document is a text file, in one embodiment, the processor 1310 determines directly based on the filename extension. More explicitly, when the filename extension of the first document is such as .doc, .xls, .ppt, .txt, ect., the first document is determined being a text file. When the filename extension of the first document is such as .pdf, .tif, .tiff, etc., the first document is determined not being a text file. When the processor 1310 needs to perform the image recognition process on the first document, the processor 1310 performs the Optical Character Recognition (OCR) on the first document to generate the text file thereof.

Then the processor 1310 stores the first document to the first database 1100 according to the access instruction, and the search index corresponding to the first document is stored in the search database 1330 of the server 1300. The search index includes the key character strings of the first document and the first address recording where the first document is stored. In this embodiment, the first address refers to the first database 1100. In some embodiments, the search index further includes the filename of the first document. In other embodiments, when the first document is not a text file, the text file corresponding to the first document by image recognition process may be part of the search index of the first document. In other words, the text file of the first document may be the backup file of the first document, so the user may check whether the first document is the needed document when the user is searching files.

In certain conditions, the first database 1100 is not receiving the file from the server 1300. Explicitly, the user directly stores a second document into the first database 1100 not via the server 1300. Hence, the server 1300 cannot build the search index corresponding to the second document. To solve this problem, the disclosure provides the following method.

In one embodiment, when the first database 1100 stores the second document, the first database 1100 informs the server 1300 with the writing information of the second document. When the server 1300 receives the writing information corresponding to the second document, the server 1300 captures the second document from the first database 1100 and performs the aforementioned flow for building the search index so as to build the second search index corresponding to the second document.

In another embodiment, the first database 1100 would not initiatively send the writing information of the second document to the server 1300. Then, the server 1300 periodically or casually checks the file arrangement table or file allocation table (FAT) of the first database 1100. For example, every time when the server 1300 writes a document to the first database 1100, the sever 1300 requests for the file arrangement table of the first database 1100. Hence, the processor 1310 may compare the current obtained file arrangement table of the first database 1100 with the previous obtained file arrangement table of the first database 1100. If the two file arrangement tables do not match with each other, the processor 1310 processes according to the current file arrangement table.

For example, if the current file arrangement table of the first database 1100 indicates that a third document is stored in the first database 1100, and the recorded file arrangement table of the first database 1100 does not have the record of the third document, the processor 1310 captures the third document from the first database 1100 and generates a third search index corresponding to the third document and refresh the recorded file arrangement table at the same time. If the recorded file arrangement table of the first database 1100 indicates that a fourth document is stored in the first database 1100 and the current file arrangement table of the first database 1100 does not include the data corresponding to the fourth document, the processor 1310 deletes the fourth search index corresponding to the fourth document from the search database 1330 and refreshes the recorded file arrangement table.

Figure 2A:
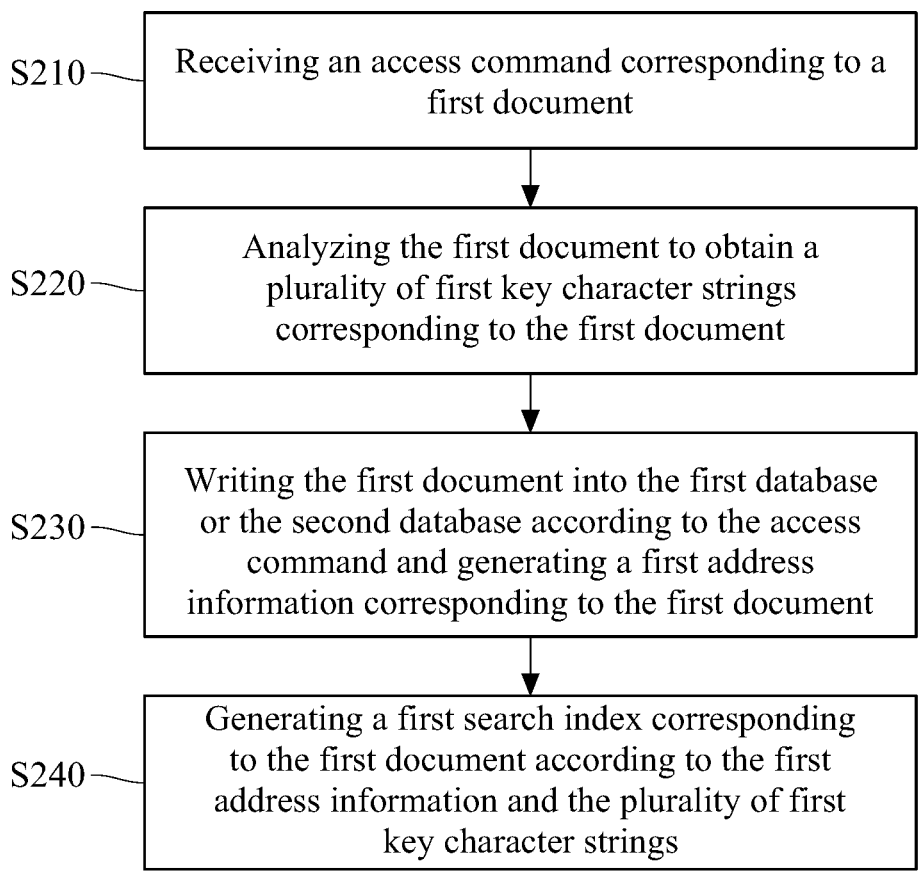
FIG. 2A illustrate a flow of a method for generating a search index according to one embodiment of the disclosure.

Therefore, please refer to FIG. 2A, which illustrate a flow of a method for generating a search index according to one embodiment of the disclosure. As shown in FIG. 2A, the method for generating a search index according to one embodiment of the disclosure includes the following steps: In step S210, an access instruction corresponding to the first document is received. In step S220, a plurality of first key character strings corresponding to the first document are obtained by analyzing the first document. In step S230, the first document is written into the first database or the second database according to the access instruction, and a first address information corresponding to the first document is generated. In step S240, a first search index corresponding to the first document is generated according to the first address information and the first key character strings.

Figure 2B:
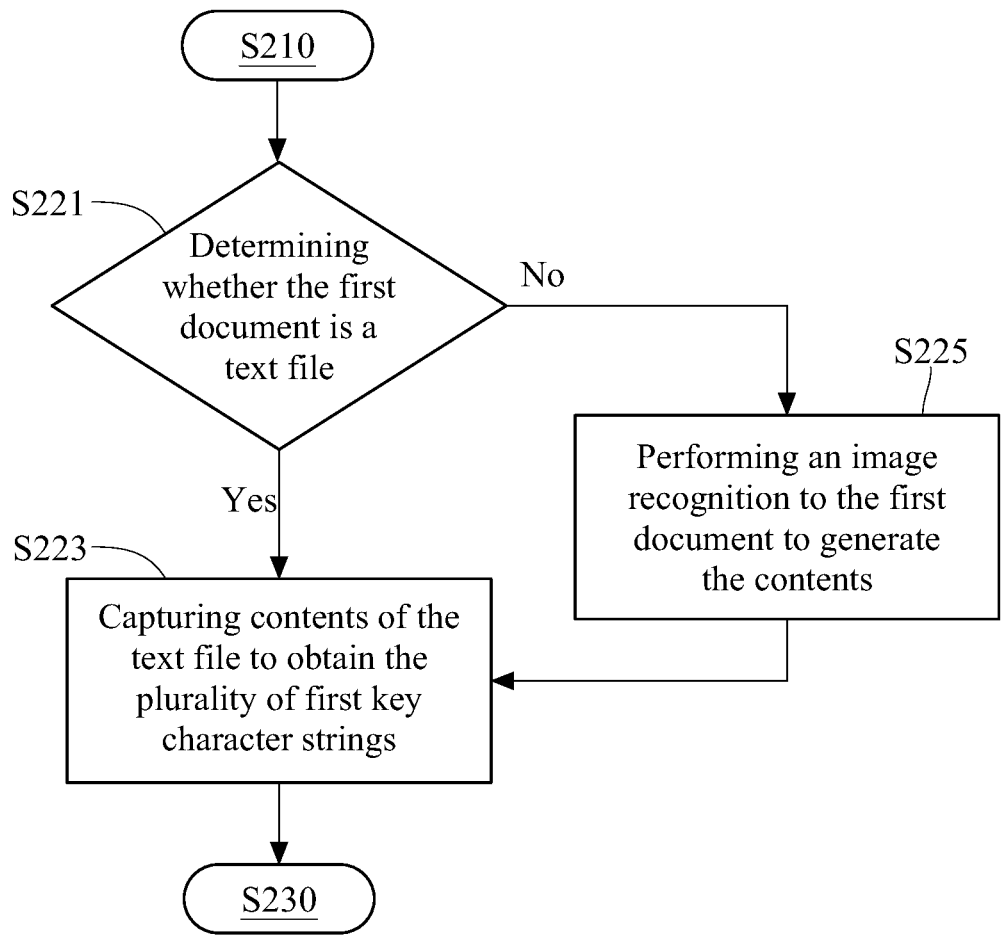
FIG. 2B illustrates a flow of step S220 according to one embodiment of the disclosure.

Further, please refer to FIG. 2B, which illustrates a flow of step S220 according to one embodiment of the disclosure. As shown in FIG. 2B, step S220 includes the sub-steps as following: step S221, it is determined whether the first document is a text file. When the first document is a text file, the step S223 is performed to capture the content of the text file to obtain one or more first key character strings. Otherwise, the step S225 is performed to perform an image recognition process on the first document to generate the text content of the first document. After the step S225 is performed, it goes back to the step S223. The flow goes to step S220 after the step S223 is performed.

When the user wants to search specific document, the user may connect the server 1300 and search the specific keywords on the server 1300. The file name and access address, such as the first database 1100 or the second database 1200, of the documents with the specific keywords may be obtained from the search database 1330. Hence, the user needs not search the specific file database by database.

Figure 3:
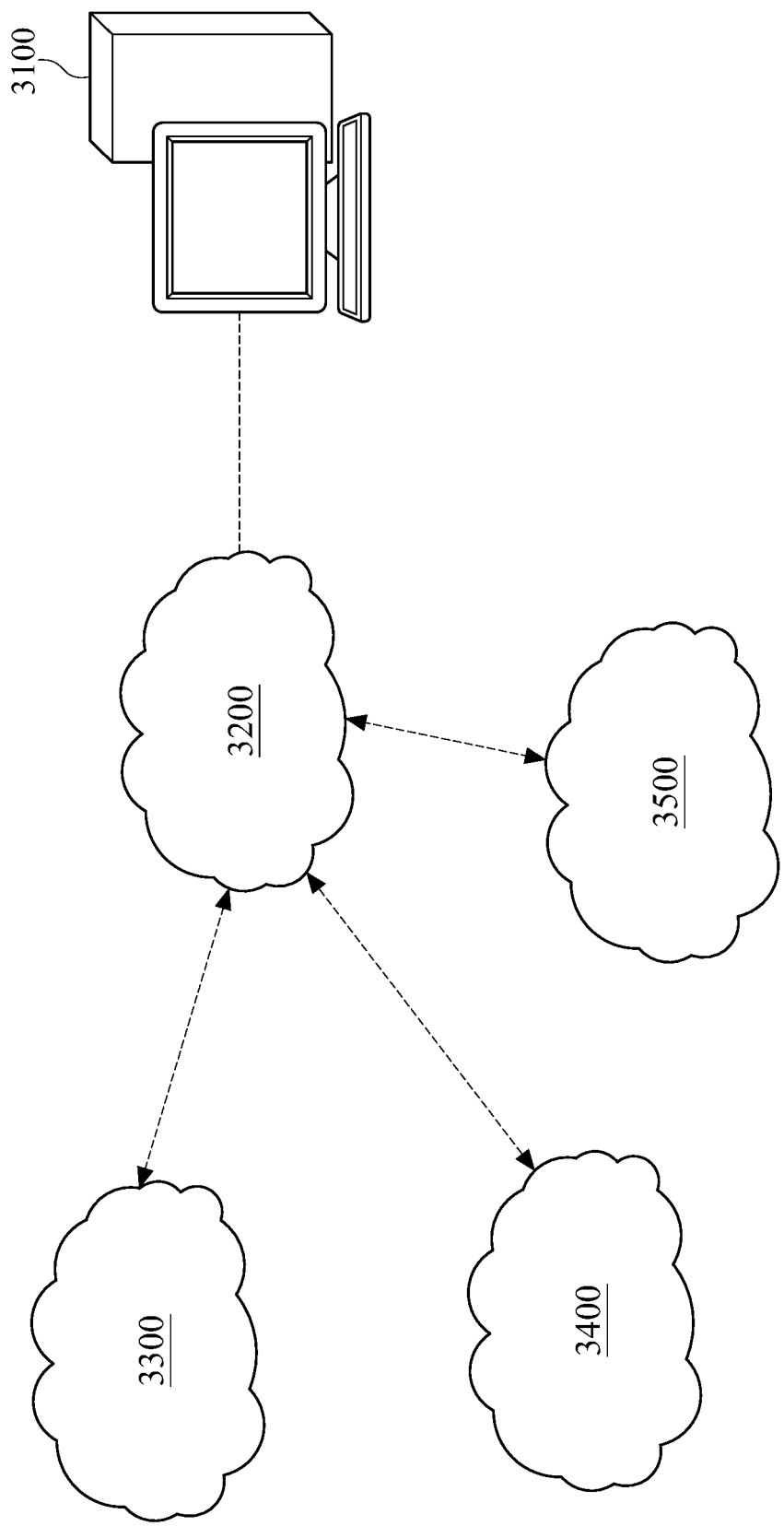
FIG. 3, which is architecture of a database system according to another embodiment of the disclosure.

Please refer to FIG. 3, which is architecture of a database system according to another embodiment of the disclosure. As shown in FIG. 3, the user may access the server 3200 via the terminal device 3100, and the architecture of the server 3200 is the same as the server 1300 in FIG. 1. The server 3200 records the first access key of the user to the first database 3300, the second access key of the user to the second database 3400, and the third access key of the user to the third database 3500. Each of the access key, for example, includes the user identity and the password of the user, and the three access keys may be the same or different from each other. Hence, whether the user access the server 3200 or not, the server 3200 may access each of the databases periodically or from time to time. For example, when the server 3200 accesses the first database 3300, the server 3200 ask the first database 3300 for its file arrangement table. The server 3200 further checks the recorded file arrangement table in the server 3200 according to the file arrangement table of the first database 3300 so as to determine whether the files stored in the first database 3300 are the same as the record in the server 3200. Then, the recorded file arrangement table is refreshed accordingly, and the method is described above. In the embodiment, the server 3200 access each of the database via the internet.

As above, when the document is stored into the database by the server, the information of the target database is taken as part of the search index of the document, so the user may quickly get which database the document with the specific keywords is stored in via the server. Additionally, the server may refresh the file arrangement table corresponding to the database periodically or from time to time so as to selectively refresh the search index.

What is claimed is:

1. A method for generating a search index, applicable for a database system having a first database and a second database, wherein the method comprises:
    receiving an access instruction corresponding to a first document and recording an access key;
    analyzing the first document to obtain a plurality of first key character strings corresponding to the first document;
    storing the first document into the first database or/and the second database via the internet according to the access instruction and the access key, and generating a first address information corresponding to the first document;
    generating a first search index corresponding to the first document according to the first address information and the plurality of first key character strings;
    receiving a writing information corresponding to a second document from the first database;
    capturing the second document from the first database according to the writing information;
    analyzing the second document to obtain a plurality of second key character strings corresponding to the second document;
    generating a second address information corresponding to the second document according to the writing information; and
    generating a second search index corresponding to the second document according to the second address information and the plurality of second key character strings.

2. The method according to claim 1, wherein the step of analyzing the first document to obtain a plurality of first key character strings corresponding to the first document comprises:
    when the first document is a text file, capturing contents of the text file to obtain the plurality of first key character strings; and
    when the first document is not the text file, performing an image recognition to the first document to generate the contents of the first document and to obtain the plurality of first key character strings accordingly.

3. The method according to claim 2, wherein the image recognition is Pattern Recognition.

4. A server applicable for communicating with a first database and a second database, wherein the server comprises:
    a processor configured for analyzing a first document to obtain a plurality of first key character strings corresponding to the first document when receiving an access instruction corresponding to the first document and recording an access key; and
    an access controller communicating with the processor, the first database and the second database, and configured for writing the first document to the first database or the second database via the internet according to the access instruction and the access key, and for generating a first address information corresponding to the first document;
    wherein the processor further generates a first search index corresponding to the first document with the first address information and the plurality of first key character strings,
    wherein when the first database sends a writing information corresponding to a second document to the server, the processor determines whether the second document is written into the first database by the processor, and when the second document is not written by the processor, the processor captures the second document from the first database via the access controller, and the processor analyzes the second document to obtain a plurality of second key character strings corresponding to the second document, and the processor further generates a second address information according to the writing information and generates a second search index corresponding to the second document according to the second address information and the plurality of second key character strings.

5. The server according to claim 4, further comprising an image capturing device communicating with the processor and used for capturing an image of a paper document to generate the first document.

6. The server in claim 4, wherein the processor further determines whether the first document is a text file, and when the first document is not the text file, the processor performs an image recognition process on the first document to generate the text file of the first document, and the processor captures contents of the text file of the first document to obtain the plurality of first key character strings, and when the first document is the text file, the processor captures the contents of the first document to obtain the plurality of first key character strings.

7. The server according to claim 6, wherein the processor performs the image recognition process of an Optical Character Recognition on the first document.

* * * * *